Sept. 20, 1960 J. F. ROESEL, JR 2,953,754

TRANSISTOR INVERTER CIRCUIT

Filed May 29, 1957

United States Patent Office 2,953,754

Patented Sept. 20, 1960

2,953,754

TRANSISTOR INVERTER CIRCUIT

John F. Roesel, Jr., Pittsburgh, Pa., assignor to Westinghouse Electric Corporation, East Pittsburgh, Pa., a corporation of Pennsylvania Filed May 29, 1957, Ser. No. 662,417

13 Claims. (Cl. 331—113)

Figure 1:
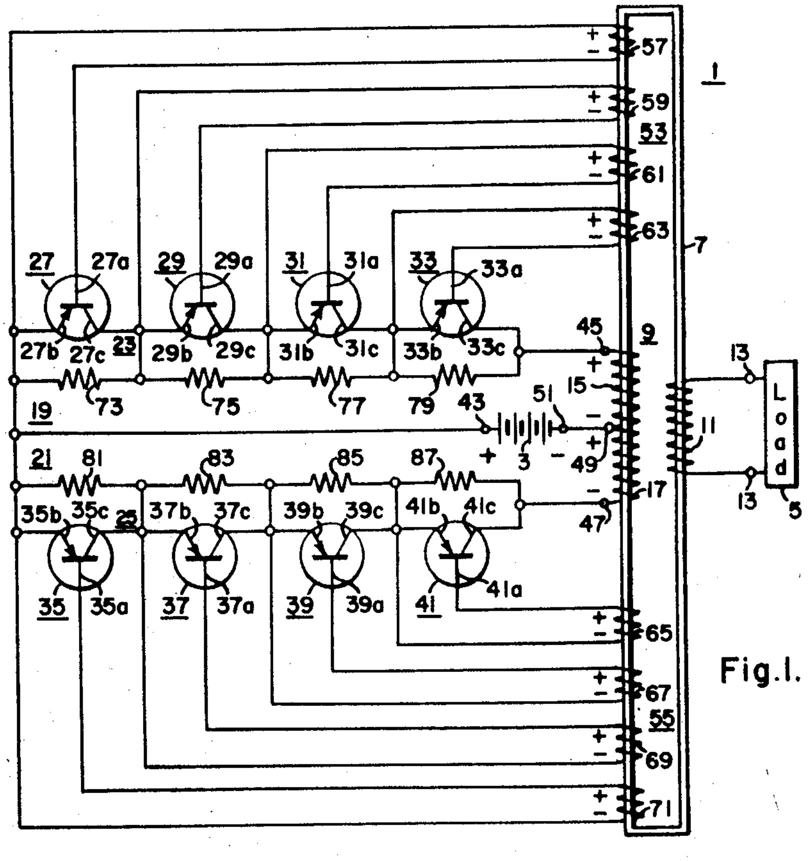

This invention relates to transistor circuits and has particular relation to transistor inverter circuits of the self-excited type.

Although the invention has many and varied uses, it will be described in connection with transistor inverter circuits of the self-excited type.

A self-excited inverter circuit is described in United States Patent No. 2,783,384, issued February 26, 1957. The circuit there described includes saturable magnetic core means connected for magnetization from a direct input quantity through a pair of current paths which provide opposing directions of magnetization of the core means.

A separate switch device is included in each of the paths having operating conditions which are transferable in phase opposition relative to each other in response to saturation of the core means. The switch devices are preferably in the form of a pair of transistor devices. The core means includes output winding means for supplying to a suitable load device an alternating output quantity having a rectangular wave pattern with a frequency proportional to the magnitude of the direct input quantity.

In the circuit described, the arrangement is such that when one of the transistor switches is in a conducting condition the blocked voltage applied across the other non-conducting transistor switch is equal to approximately twice the magnitude of the direct input voltage. In order to prevent failure of the transistors during operation of this type circuit, it is therefore necessary to employ direct voltage input quantities having magnitudes which are less than one-half the value of the rated collector breakdown voltage of the transistors. This then, imposes a limitation upon both the power and frequency obtainable from the circuit.

According to the present invention, an electrical inverter circuit is provided for producing an alternating output quantity from a direct input voltage with an improved arrangement permitting the employment of direct input voltages having magnitudes larger than heretofore utilized. For this purpose, the invention provides an inverter circuit including a pair of transistor switches with separate impedance means serially connected with each of the transistors such that the blocked voltage is divided between the non-conducting transistor and the associated impedance means.

In a preferred embodiment of the invention, each of the impedance means is in the form of a plurality of transistors operated as controlled switch devices. A like number of transistors is preferably included in each current path to provide a symmetrical arrangement. With this arrangement, when the transistors included in one of the paths are in a non-conducting condition a separate portion of the blocked voltage is applied to each of the non-conducting transistors. The magnitudes of these separate voltage portions depend upon the leakage resistance of the transistors. As a result, the magnitude of the direct input voltage may be greater than the magnitude thereof if only a single transistor were included in each of the current paths.

In order to assure that the portions of the blocked voltage applied to the transistors are substantially equal, the invention further provides that a separate resistor be connected across the emitter and collector electrodes of each transistor. The magnitude of each resistor is selected to be small as compared to the magnitude of the leakage resistance of the associated transistor and large as compared to the magnitude of the forward resistance of a conducting transistor. These resistors, therefore, essentially determine the proportion of the blocked voltage which is applied to the non-conducting transistors. By selecting the values of the resistors to be substantially equal, the portions of the applied blocked voltage will have substantially equal values.

It is, therefore, an object of the invention to provide an improved transistor circuit.

It is another object of the invention to provide a transistor circuit including a transistor switch energized from a direct voltage source with impedance means connected in series with the transistor to support at least a portion of the voltage blocked by the transistor when in an open condition.

It is still another object of the invention to provide an improved self-excited inverter circuit for producing an alternating output quantity from a direct input voltage having a frequency proportional to the magnitude of the input voltage.

It is a further object of the invention to provide an inverter circuit as defined in the preceding paragraph including means permitting the employment of direct input voltages of greater magnitudes than heretofore utilized.

It is still another object of the invention to provide an inverter circuit as defined in said preceding paragraph including means providing larger power outputs than heretofore obtainable.

It is still another object of the invention to provide an inverter circuit including a pair of transistor switches arranged to alternately switch a direct voltage across translating means with impedance means connected in series with the transistors to divide a blocked voltage which is applied across a non-switching transistor and the associated impedance means.

Figure 2:
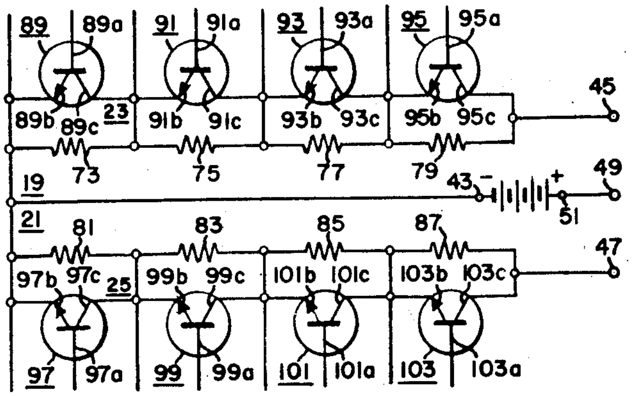

Other objects of the invention will become apparent from the following description taken in conjunction with the accompanying drawings, in which:

Figure 1 is a circuit diagram illustrating an electrical inverter circuit embodying the teachings of the invention; and Fig. 2 is a circuit diagram similar to Fig. 1 illustrating a different embodiment of the invention.

Referring to the drawings, there is illustrated in Fig. 1 a transistor circuit represented generally by the numeral 1 embodying the teachings of the present invention. The circuit 1 is shown in the form of an inverter circuit including a source of unidirectional voltage which is represented by the battery 3 for providing a unidirectional input quantity which is to be inverted.

The source 3 may comprise any suitable source of unidirectional voltage having either a constant or variable magnitude. A suitable load device schematically represented by the block 5 is shown in association with the circuit 1 for energization in accordance with an alternating output quantity of the circuit 1.

The circuit 1 includes a translating means shown in the form of a transformer including a magnetic core 7 which may be constructed of any suitable magnetic material. The core 7 is preferably formed of a material which exhibits substantially rectangular hysteresis loop characteristics. A number of such materials are commercially available at the present time. For example, the core 7 may be constructed of an alloy comprising approximately equal parts of nickel and iron. The core 7 is further designed for magnetic saturation within the range of energization thereof.

In order to permit magnetization of the core 7, suitable input winding means 9 are provided to link the core. An output winding 11 also links the core 7 in inductive relation with the winding means 9 for supplying an alternating output quantity to the load device 5. The winding 11 is provided with a pair of output terminals 13 connected to the load device 5 to permit energization of the device 5 in accordance with voltage induced in the winding 11 in response to energization of the winding means 9.

For the purpose of permitting magnetization of the core 7 in accordance with current of the source 3 for causing the induction of an alternating output voltage in the winding 11, the winding means 9 comprises a pair of winding sections 15 and 17 each connected for energization from the source 3 through a separate current path to provide opposing directions of magnetization of the core 7. As illustrated in Fig. 1, the winding section 15 is included in a current path 19 whereas the winding section 17 is included in a current path 21.

In order to control energization of the winding sections 15 and 17 from the source 3, a pair of switch means represented generally by the numerals 23 and 25 are included respectively in the current paths 19 and 21. Each of the switch means preferably includes a transistor device. As shown in Fig. 1, the switch means 23 includes a transistor 27 whereas the switch means 25 includes a transistor 35.

As will be described more fully hereinafter when one of the transistors 27 and 35 is in a conducting condition, a blocked voltage is applied across the non-conducting one of these transistors. According to the present invention, the circuit 1 includes impedance means serially connected with each of the transistors 27 and 35 such that the blocked voltage is divided between the non-conducting transistor and the impedance means.

In accordance with a preferred embodiment of the present invention, each of the impedance means is in the form of a plurality of transistors which are connected in series relation in a separate one of the current paths. As illustrated in Fig. 1, the impedance means in the path 19 comprises series connected transistors 29, 31 and 33 whereas the impedance means in the path 21 comprises transistors 37, 39 and 41. As will presently appear, the provision of the impedance means permits the utilization of larger values of voltage of the source 3 than heretofore employed.

The transistors of each of the impedance means are preferably operated as controlled switch devices in the manner of the transistors 27 and 35. In view of this, each of the switch means 23 and 25 may be considered to comprise a plurality of transistors. Although the switch means are each illustrated as comprising four transistors, excellent results have been obtained with other numbers of transistors. For example, three transistors in each current path have been utilized successfully. In order to provide a symmetrical arrangement, it is desirable that a like number of transistors be included in the paths.

In Fig. 1 the several transistors are shown in the form of P-N-P transistors each having a base electrode, an emitter electrode, and a collector electrode. For example, the transistor 27 includes a base electrode 27*a*, an emitter electrode 27*b*, and a collector electrode 27*c*. Corresponding electrodes of the remaining transistors are represented by the same reference numeral as the associated transistor with the suffixes *a*, *b* and *c*.

In the present invention each of the transistors is biased to operate as a controlled switch device having a closed operating condition wherein the transistor exhibits a very low impedance condition between the emitter and collector electrodes and having an open operating condition wherein the transistor exhibits a very high impedance condition between the emitter and collector electrodes. This high impedance condition may be referred to as the leakage resistance of the transistor.

In order to provide efficient operation of the circuit 1, the several transistors are preferably operated to transfer between saturated and cut-off current conducting conditions. As employed herein the term "saturated" denotes a condition of a transistor wherein a further increase in the magnitude of forward current between the base and emitter electrodes has a negligible effect upon the magnitude of current between the emitter and collector electrodes. This saturated condition corresponds to the closed operating condition of the transistor. The term cut-off as employed herein refers to a condition of a transistor wherein a further increase in the magnitude of reverse voltage between the base and emitter electrodes is ineffective to further decrease the magnitude of current between the emitter and collector electrodes. The cut-off condition corresponds to the open operating condition of the transistor.

As illustrated in Fig. 1, the emitter electrodes 27*b* and 35*b* of the transistors 27 and 35 are each connected to the positive terminal 43 of the source 3. The collector electrodes 33*c* and 41*c* of the transistors 33 and 41 are connected respectively to the end terminals 45 and 47 of the winding means 9. A center tap connection 49 of the winding means 9 is connected to the negative terminal 51 of the source 3.

It is noted that the emitter and collector electrodes of each of the transistors are included in the associated current paths 19 and 21. In order to provide a series connection of the transistors in the path 19, the collector electrode 27*c* of the transistor 27 is connected to the emitter electrode 29*b* of the transistor 29. The collector electrode 29*c* of the transistor 29 is connected to the emitter electrode 31*b* of the transistor 31 with the collector electrode 31*c* connected to the emitter electrode 33*b*.

In a similar manner in the path 21 the collector electrode 35*c* of the transistor 35 is connected to the emitter electrode 37*b* of the transistor 37 with the collector electrode 37*c* connected to the emitter electrode 39*b* of the transistor 39. The collector electrode 39*c* is connected to the emitter electrode 41*b* of the transistor 41.

In order to control operation of the several transistors, control means illustrated in the form of a pair of winding means represented generally by the numerals 53 and 55 are provided to link the core 7 in inductive relation with the winding sections 15 and 17. The winding means 53 is connected to apply bias voltages induced therein to each of the transistors included in the current path 19. In a similar manner the winding means 55 is connected to apply bias voltages induced therein to each of the transistors included in the current path 21. The winding means 53 and 55 are further arranged to apply bias voltages for simultaneously establishing a conductive condition of the transistors in the path 19 which is opposite to the conductive condition of the transistors in the path 21.

For this purpose each of the winding means 53 and 55 comprises a plurality of independent windings each connected to a separate one of the associated transistors. As illustrated in Fig. 1, the winding means 53 comprises windings 57, 59, 61 and 63, whereas the winding means 55 comprises windings 65, 67, 69 and 71.

It is noted that each of these bias windings is connected to apply bias voltages between the base and emitter electrodes of the associated transistor. For example, the terminals of the winding 57 are connected respectively to the base electrode 27*a* of the transistor 27 and to the emitter electrode 27*b* of the transistor 27. Similar connections of the remaining bias windings are made to their associated transistors.

As will appear hereinafter, a blocked voltage is applied across the non-conducting transistors which is equal to substantially twice the magnitude of voltage of the source 3. According to the present invention, means are provided for causing substantially equal portions of this blocked voltage to be applied to the non-conducting transistors. For this purpose, a separate resistor is connected across the emitter and collector electrodes of each transistor. As illustrated in Fig. 1, resistors 73, 75, 77, 79, 81, 83, 85 and 87 are connected respectively across the emitter and collector electrodes of the transistors 27, 29, 31, 33, 35, 37, 39 and 41.

In a preferred embodiment of the invention, the value of each of the several resistors is selected to be small as compared to the leakage resistance of the associated transistors, and large as compared to the forward resistance of the transistor when in a conducting condition. With this arrangement, the value of the several resistors determines the proportion of the blocked voltage which is applied to the transistors. Consequently, by selecting the resistance values to be substantially equal, substantially equal portions of the blocked voltage will be applied to the transistors.

Operation of the circuit 1 will now be briefly described. Let it be initially assumed that one of the transistors in the current path 19 begins to conduct in advance of the transistors in the path 21. Then a substantial portion of current from the source 3 flows through the series-connected emitter and collector electrodes of the transistors 27, 29, 31 and 33. A small portion of this current also flows through the resistors 73, 75, 77 and 79. These current portions then unite at the terminal 45 to flow through the winding section 15.

Current flow through the winding section 15 establishes a magnetomotive force which directs magnetic flux through the core 7. This flux increases at a constant rate to therefore induce constant voltages in the several winding means 9, 11, 53 and 55. These induced voltages have polarities as indicated by the plus and minus signs associated with the several windings.

The voltages so induced in the winding means 53 and 55 are applied to the associated transistors such that transistors in the path 19 are maintained in a conducting condition whereas the transistors in the path 21 are maintained in a non-conducting condition. This action continues until the core 7 is magnetically saturated whereupon the values of the induced voltages fall to a zero value.

Such reduction of the induced voltages results in the subsequent induction of voltages in the several windings of the core 7 having polarities opposite to those shown. Voltages so induced in the winding means 53 and 55 are effective to initiate a reversal of the conducting conditions of the transistors in the current paths 19 and 21. The action then reverses with current flowing from the source 3 in parallel through the series connected emitter and collector electrodes of the transistors in the path 21 and the several resistors, and through the winding section 17. Such current flow results eventually in magnetic saturation of the core in the direction opposite to saturation caused by current flowing from the source 3 through the winding section 15. At this point a complete cycle of operation of the circuit 1 is completed.

During this cycle an alternating output voltage is induced in the winding 11 having a rectangular wave form with a frequency proportional to the magnitude of voltage of the source 3. Further details of the operation of the circuit 1 may be found in the aforementioned Patent No. 2,783,384.

During operation of the circuit 1, it is observed that a blocked voltage is applied to the non-conducting transistors having a magnitude which is equal to substantially twice the value of voltage of the source 3. This may be explained by considering that when the transistors in the path 19 are conducting a voltage is induced in the winding section 17 having the polarity shown which is substantially equal to the value of voltage of source 3. With the circuit connections shown voltage of the source 3 and the voltage induced in the winding section 17 act in the same direction about the path 21 to provide a resultant voltage of substantially twice the value of the voltage of source 3 which is applied across the transistors in the path 21.

When only a single transistor is employed in each of the current paths as in the aforementioned patent, it is necessary that the value of voltage of the input source be less than one half the value of the rated collector breakdown voltage of the transistors to avoid damage to the transistors when in a non-conducting condition. This arrangement imposes a limitation upon both the power and frequency obtainable from the circuit.

In the present invention the provision of a plurality of series-connected transistors in each of the current paths permits the employement of larger values of the input voltage without fear of damage to the transistors inasmuch as a separate portion of the blocked voltage is applied across each transistor. The invention therefore permits the production of larger power magnitudes and higher frequencies than heretofore obtainable in such circuits.

Furthermore, the provision of the several resistors across the emitter and collector electrodes of the transistors in accordance with the invention assures that substantially equal portions of the blocked voltage are applied across the transistors. This arrangement permits the employment of transistors having different values of leakage resistance without fear of damage to the transistor having the greatest leakage resistance.

In a particular application of the invention four transistors were employed in each current path. Each of these transistors were rated at 12 amperes collector current and 80 volts collector to emitter voltage. The value of each of the several resistors 73, etc., was selected to be of the order of 1000 ohms. With such arrangement and with a value of voltage of the source 3 of 28 volts, the blocked voltage across each non-conducting transistor was observed to be approximately 14 volts.

However, with the several resistors 73, etc., removed, the blocked voltage across the non-conducting transistors with the 28 volt input ranged from 3 volts to 25 volts. With the several resistors included in the circuit and with a value of voltage of the source 3 of 120 volts, the circuit operated satisfactorily to produce an output frequency of 1000 cycles per second with an output power of one kilowatt. The efficiency at 500 watts output power was observed to be approximately 88%.

In Fig. 2 there is illustrated a circuit of different construction than the circuit of Fig. 1. Similar components in Figs. 1 and 2 are represented by the same reference numeral. In Fig. 2 the transistors employed are of the N-P-N type rather than the P-N-P type of Fig. 1. With this arrangement, it is necessary to reverse connections of the source 3 from the connections illustrated in Fig. 1.

A device constructed in accordance with the present invention may be employed to advantage in numerous applications. For example, such a device may be utilized to convert conventional one hundred and twenty volt, sixty cycle power to higher frequency power without the provision of a power transformer for reducing the value of the input voltage. This is highly advantageous in lighting applications such as fluorescent lighting. In place of a power transformer suitable rectifier means may be provided to produce from the sixty cycle power the direct input voltage.

Although the invention has been described with reference to certain embodiments thereof, numerous modifications are possible and it is desired to cover all modifications falling within the scope of the invention.

I claim as my invention:

1. In an electrical system, a source of unidirectional input voltage, translating means, a pair of output terminals energizable from said translating means, a pair of electrical paths connecting the translating means for energization from said source to provide opposing directions of energization of said translating means, an electroresponsive valve device associated with each of said paths, each of said devices having at least three electrodes with a pair of said electrodes connected in the associated path, control means for producing biasing potentials of reversing polarity for biasing said devices, said control means being connected to apply a separate biasing potential between one electrode of each pair of electrodes and a third electrode of each device, each of said devices having a substantially non-conducting condition between said pair of electrodes for one polarity of biasing potential, and a conducting condition between said pair of electrodes for the opposite polarity of biasing potential, said control means being connected to apply said biasing potentials with polarities effective to simultaneously establish a conducting condition of the device in one path and a non-conducting condition of the device in the other path, each of said devices being biased so as to transfer from one to the other of said conducting conditions in response to each reversal of polarity of the applied biasing potential, said translating means delivering to said output terminals an alternating quantity having a frequency dependent upon the frequency of reversal of polarity of said biasing potentials, said source providing at least a portion of a voltage which is blocked by said devices when in a non-conducting condition, and impedance means connected in each of said paths in series with the associated device having a portion of said blocked voltage impressed thereacross.

2. In an electrical system, a source of unidirectional input voltage, transformer means including core means with input and output winding means linking the core means in inductive relation, output terminal means connected to said output winding means, a pair of electrical paths connecting the input winding means for energization from said source to provide opposing directions of magnetization of said core means, an electroresponsive valve device associated with each of said paths, each of said devices having at least three electrodes with a pair of said electrodes connected in the associated path, and control means for producing biasing potentials of reversing polarity for biasing said devices, said control means being connected to apply a separate biasing potential between one electrode of each pair of electrodes and a third electrode of each device, each of said devices having a substantially non-conducting condition between said pair of electrodes for one polarity of biasing potential, and a conducting condition between said pair of electrodes for the opposite polarity of biasing potential, said control means being connected to apply said biasing potentials with polarities effective to simultaneously establish a conducting condition of the device in one path and a non-conducting condition of the device in the other path, each of said devices being biased so as to transfer from one to the other of said conducting conditions in response to each reversal of polarity of the applied biasing potential, said output winding means delivering to said output terminals an alternating quantity having a frequency dependent upon the frequency of reversal of polarity of said biasing potentials, said source and said input winding means providing a voltage which is blocked by said devices when in a non-conducting condition, and impedance means connected in each of said paths in series with the associated device having a portion of said blocked voltage impressed thereacross.

3. In an electrical system, a source of unidirectional input voltage, transformer means including core means with input and output winding means linking the core means in inductive relation, output terminal means connected to said output winding means, a pair of electrical paths connecting the input winding means for energization from said source to provide opposing directions of magnetization of said core means, a transistor device associated with each of said paths, each of said devices having base, emitter and collector electrodes with the emitter and collector electrodes connected in the associated path, control means for producing biasing potentials of reversing polarity for biasing said devices, said control means being connected to apply a separate biasing potential between one of the emitter and collector electrodes and the base electrode of each device, each of said devices having a substantially non-conducting condition between the emitter and collector electrodes for one polarity of biasing potential, and a conducting condition between the emitter and collector electrodes for the opposite polarity of biasing potential, said control means being connected to apply said biasing potentials with polarities effective to simultaneously establish a conducting condition of the device in one path and a non-conducting condition of the device in the other path, each of said devices being biased so as to transfer from one to the other of said conducting conditions in response to each reversal of polarity of the applied biasing potential, said output winding means delivering to said output terminals an alternating quantity having a frequency dependent upon the frequency of reversal of polarity of said biasing potentials, said source and said input winding means providing a voltage which is blocked by said devices when in a non-conducting condition, and impedance means connected in each of said paths in series with the associated device having a portion of said blocked voltage impressed thereacross.

4. In an electrical system, a source of unidirectional input voltage, transformer means including core means with input and output winding means linking the core means in inductive relation, output terminal means connected to said output winding means, a pair of electrical paths connecting the input winding means for energization from said source to provide opposing directions of magnetization of said core means, a separate plurality of transistor devices associated with each of said paths, each of said devices having base, emitter and collector electrodes with the emitter and collector electrodes connected in the associated path, the emitter and collector electrodes of the devices in each path being connected in series relation, and control means for producing biasing potentials of reversing polarity for biasing said devices, said control means being connected to apply a separate biasing potential between one of the emitter and collector electrodes and the base electrode of each device, each of said devices having a substantially non-conducting condition between the emitter and collector electrodes for one polarity of biasing potential, and a conducting condition between the emitter and collector electrodes for the opposite polarity of biasing potential, said control means being connected to apply said biasing potentials with polarities effective to simultaneously establish a conducting condition of the devices in one path opposite to the conducting condition of the devices in the other path, each of said devices being biased so as to transfer from one to the other of said conducting conditions in response to each reversal of polarity of the applied biasing potential, said output winding means delivering to said output terminals an alternating quantity having a frequency dependent upon the frequency of reversal of polarity of said biasing potentials.

5. In an electrical inverter system, a pair of output terminals, a source of unidirectional voltage, and inverter means for delivering to the output terminals an alternating output voltage having a frequency dependent upon the magnitude of said source, said inverter means including saturable magnetic core means, a pair of electrical paths connected for energization from said source for supplying to said core means magnetomotive forces acting in opposing directions, a separate plurality of transistor devices associated with each of said paths, each of said devices having base, emitter and collector electrodes with the emitter and collector electrodes connected in the associated path, the emitter and collector electrodes of the devices in each path being connected in series relation, said devices being operable to transfer the associated path between a conductive condition and a substantially non-conductive condition, control means effective in response to saturation of said core means produced by a conductive condition of one of said paths while the other of said paths is in a substantially non-conductive condition to apply biasing potentials between the base electrode and one of the emitter and collector electrodes of each of said devices to simultaneously operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to simultaneously operate said devices for reversing the conductive conditions of said paths, and output winding means linking said core means to deliver to said output terminals alternating voltage induced therein having a frequency dependent upon the frequency of saturation of said core means.

6. In an electrical inverter system, a pair of output terminals, a source of unidirectional voltage, and inverter means for delivering to the output terminals an alternating output voltage having a frequency dependent upon the magintude of said source, said inverter means including saturable magnetic core means, a pair of electrical paths connected for energization from said sources for supplying to said core means magnetomotive forces acting in opposing directions, a separate plurality of transistor devices associated with each of said paths, each of said devices having base, emitter and collector electrodes with the emitter and collector electrodes connected in the associated path, the emitter and collector electrodes of the devices in each path being connected in series relation, a separate resistor connected across the emitter and collector electrodes of each device, each resistor being selected to have a resistance which is small compared to the leakage resistance of the associated device, said devices being operable to transfer the associated path between a conductive condition and a substantially non-conductive condition, control means effective in response to saturation of said core means produced by a conductive condition of one of said paths while the other of said paths is in a substantially non-conductive condition to simultaneously apply biasing potentials between the base electrode and one of the emitter and collector electrodes of each of said devices to operate said devices for reversing the conductive conditions of said paths, said control means being additionally effective in response to saturation of said core means produced by a conductive condition of said other of said paths while said one of said paths is in a substantially non-conductive condition to apply biasing potentials between the base electrode and one of the emitter and collector electrodes of each of said devices to simultaneously operate said devices for reversing the conductive conditions of said paths, and output winding means linking said core means to deliver to said output terminals alternating voltage induced therein having a frequency dependent upon the frequency of saturation of said core means.

7. In an electrical system, a source of unidirectional voltage, magnetic core means, first, second and third winding means linking the core means in inductive relation relative to one another, a plurality of transistor devices each including a base electrode, an emitter electrode and a collector electrode, said first winding means being connected for energization from said source through separate paths effecting opposing directions of magnetization of said core means, and a pair of output terminals energizable from said second winding means, each of said paths including a like number of said devices with the emitter and collector electrodes connected in the associated path, the emitter and collector electrodes of the devices in each path being connected in series relation, said core means being proportioned for saturation within the range of energization of said first winding means, said third winding means being connected to apply voltages induced therein between the base electrode and one of the emitter and collector electrodes of each of said devices, each of said devices having a cutoff current conducting condition between the emitter and collector electrodes for one polarity of said induced voltages, and a saturated current conducting condition between the emitter and collector electrodes for the opposite polarity of said induced voltages, said third winding means being connected to simultaneously apply said induced voltages with polarities effective to establish a cutoff condition of the devices in one path and a saturated condition of the devices in the other path, the devices in each path being biased so as to transfer from one to the other of said current conducting conditions in response to voltages induced in said third winding means upon each occurrence of saturation of said core means, said second winding means delivering to said output terminals alternating voltage induced therein in response to energization of said first winding means having a frequency dependent upon the frequency of saturation of said core means.

8. In an electrical system, a source of unidirectional voltage, magnetic core means, first, second and third winding means linking the core means such that the winding means are in inductive relation relative to one another, a plurality of transistor devices each including a base electrode, an emitter electrode and a collector electrode, said first winding means being connected for energization from said source through separate paths effecting opposing directions of magnetization of said core means, and a pair of output terminals energizable from said second winding means, each of said paths including a like number of said devices with the emitter and collector electrodes of separate ones of said devices connected in the associated path, the emitter and collector electrodes of the devices in each path being connected in series relation, a plurality of resistors of substantially constant value independent of the voltage thereacross, a separate one of said resistors being connected across the emitter and collector electrodes of each device, each resistor being selected to have a resistance which is small compared to the leakage resistance of the associated device, said core means being proportioned for saturation within the range of energization of said first winding means, said core means being constructed of material exhibiting substantially rectangular hysteresis loop characteristics, said third winding means being connected to apply voltages induced therein between the base electrode and one of the emitter and collector electrodes of each of said devices, each of said devices having a cutoff current conducting condition between the emitter and collector electrodes for one polarity of said induced voltages, and a saturated current conducting condition between the emitter and collector electrodes for the opposite polarity of said induced voltages, said third winding means being connected to simultaneously apply said induced voltages with polarities effective to establish a cutoff condition of the devices in one path and a saturated condition of the devices in the other path, the devices in each path being biased so as to transfer from one to the other of said current conducting conditions in response to voltages induced in said third winding means upon each occurrence of saturation of said core means, said second winding means delivering to said output terminals alternating voltage induced therein in response to energization of said first winding means having a frequency dependent upon the frequency of saturation of said core means.

9. In an electrical system, a source of unidirectional voltage, a current path connected for energization from said source, a pair of transistor devices each having base, emitter and collector electrodes, the emitter and collector electrodes of each device being connected in said current path, biasing means for applying a reversing biasing potential between the base and one of the emitter and collector electrodes of each of said devices, said devices having a substantially non-conducting condition between the emitter and collector electrodes for one polarity of biasing potential, and a conducting condition between the emitter and collector electrodes for the opposite polarity of biasing potential, said source providing at least a portion of a voltage which is blocked by said devices when in a non-conducting condition, and a plurality of resistors of substantially constant value, separate ones of said resistors being connected across the emitter and collector electrodes of each device, each resistor being selected to have a resistance which is small compared to the leakage resistance of the associated device.

10. In an electrical system, a source of unidirectional voltage, a pair of spaced output terminals, coupling means including first and second current paths for alternately coupling the source to the output terminals, the first current path coupling the source to the output terminals with a polarity opposite to that obtained through the second current path, the first current path including in series a plurality of first resistors, a plurality of first semi-conductor switch devices each selectively operable for shunting a separate one of the first resistors, the second current path including in series a plurality of second resistors, each said resistor of each said plurality of resistors being of substantially fixed value, a plurality of second switch devices each selectively operable for shunting a separate one of the second resistors, each of the switch devices being operable between a circuit-completing condition for shunting the associated resistor and a circuit-interrupting condition for interrupting the shunt across the associated resistor, certain of the switch devices in circuit interrupting condition being subject to undesirable performance for voltages thereacross of an order appearing across a plurality of the resistors in series, and means operating the switch devices between first and second conditions, the first condition placing the first switch devices in circuit-completing condition and the second switch devices in circuit-interrupting condition, and the second condition placing the first switch devices in circuit-interrupting condition and the second switch devices in circuit-completing condition.

11. In an electrical system, a source of voltage, a pair of spaced output terminals, coupling means including a current path for coupling the source to the output terminals, said current path including in series a plurality of impedance elements, and a plurality of semi-conductor circuit devices each shunting a separate one of the impedance elements, said circuit devices under a certain first condition of said electrical system simultaneously offering a first impedance to current flowing therethrough from the source, said circuit devices under a certain second condition of the electrical system simultaneously offering an impedance substantially greater than the first impedance to current flowing therethrough from the source, certain of the circuit devices under said second condition of the system being subject to undesirable performance for voltages thereacross of an order appearing across a plurality of the impedance elements in series and of relatively fixed value, each of the impedance elements having a value less than said greater impedance to maintain the voltage across the associated circuit device below a value causing said undesirable performance.

12. In an electrical system, a source of unidirectional voltage, a current path connected for energization from said source, a plurality of semi-conductor electroresponsive valve devices each having at least three electrodes, a pair of electrodes of each device being connected in said current path, biasing means for applying a reversing biasing potential between a third electrode and one electrode of the pair of electrodes of each of said devices, said devices having a substantially non-conducting condition between the pair of electrodes for one polarity of biasing potential, and a conducting condition between the pair of electrodes for the opposite polarity of biasing potential, said source providing at least a portion of a voltage which is blocked by said devices when in a non-conducting condition, and a separate resistor connected across the pair of electrodes of each device, each resistor being selected to have a resistance which is small compared to the resistance of the associated device when in a non-conducting condition and of substantially fixed value.

13. In an electrical circuit, a pair of spaced input terminals to be connected to a source of unidirectional voltage, a pair of spaced output terminals, means including a pair of parallel current paths connected between said input and output terminals to provide when energized opposing directions of energization of the output terminals, a separate plurality of semi-conductor electroresponsive valve devices associated with each of said paths, each of said devices having at least three electrodes with a pair of said electrodes connected in the associated path, said pair of electrodes of the devices in each path being connected in series relation, a separate resistor connected across the pair of electrodes of each device, each said resistor being of substantially constant magnitude, and control means for producing biasing potentials of reversing polarity for biasing said devices, said control means being connected to apply a separate biasing potential between one electrode of each pair of electrodes and a third electrode of each device, each of said devices having a substantially non-conducting condition between said pair of electrodes for one polarity of biasing potential, and a conducting condition between said pair of electrodes for the opposite polarity of biasing potential, said control means being connected to apply said biasing potentials with polarities effective to simultaneously establish a conducting condition of the devices in one path opposite to the conducting condition of the devices in the other path, each of said devices being biased so as to transfer from one to the other of said conducting conditions in response to each reversal of polarity of the applied biasing potential, said first-named means deliversing to said output terminals an alternating quantity having a frequency dependent upon the frequency of reversal of polarity of said biasing potentials.

References Cited in the file of this patent

UNITED STATES PATENTS

| | | |
|---|---|---|
| 2,783,384 | Bright et al. | Feb. 26, 1957 |

FOREIGN PATENTS

| | | |
|---|---|---|
| 536,516 | Great Britain | May 16, 1941 |

OTHER REFERENCES

Article: "Operation of a Saturable-Core Square Wave Oscillator," by Donald C. Mogen from a paper presented to the 1956 National Conference on Aeronautical Electronics, on May 16, 1956.

UNITED STATES PATENT OFFICE

CERTIFICATE OF CORRECTION

Patent No. 2,953,754 September 20, 1960

John F. Roesel, Jr.

It is hereby certified that error appears in the printed specification of the above numbered patent requiring correction and that the said Letters Patent should read as corrected below.

Column 11, line 55, after "elements" insert -- of relativ fixed value --; lines 67 and 68, strike out "and of relatively fixed value".

Signed and sealed this 4th day of April 1961.

(SEAL)

Attest: ERNEST W. SWIDER

XXXXXXXXXX

Attesting Officer

ARTHUR W. CROCKER

Acting Commissioner of Patents